United States Patent
Bansal et al.

(10) Patent No.: US 8,396,753 B2
(45) Date of Patent: Mar. 12, 2013

(54) SIMPLIFIED ORDERS USING WORDS OR PHRASES

(75) Inventors: Ruchi Bansal, Mountain View, CA (US); Rajesh Ramanand, San Jose, CA (US)

(73) Assignee: Ebay Inc., San Jose, CA (US)

( * ) Notice: Subject to any disclaimer, the term of this patent is extended or adjusted under 35 U.S.C. 154(b) by 0 days.

(21) Appl. No.: 13/073,799

(22) Filed: Mar. 28, 2011

(65) Prior Publication Data

US 2012/0253971 A1 Oct. 4, 2012

(51) Int. Cl.
*G06Q 30/00* (2012.01)

(52) U.S. Cl. .................................... 705/26.1

(58) Field of Classification Search .............. 705/26.1, 705/26.8, 27.1
See application file for complete search history.

(56) References Cited

U.S. PATENT DOCUMENTS

| | | | | |
|---|---|---|---|---|
| 7,376,584 | B1 * | 5/2008 | Weixel | 705/17 |
| 2003/0078884 | A1 * | 4/2003 | Bauman | 705/39 |
| 2004/0230496 | A1 * | 11/2004 | Neuman et al. | 705/26 |
| 2006/0178943 | A1 * | 8/2006 | Rollinson et al. | 705/26 |
| 2007/0073586 | A1 * | 3/2007 | Dev et al. | 705/14 |

OTHER PUBLICATIONS

Anonymous, "GetQuik Makes it Easy for Apple iPhone Users to Place Restaurant Food iPhone Provides Superior Order Processing and Friction-Free Transaction," PR Newswire, Mar. 6, 2008.*

* cited by examiner

*Primary Examiner* — Brandy A Zukanovich
(74) *Attorney, Agent, or Firm* — Haynes and Boone, LLP

(57) ABSTRACT

A user communicates, such as through text, a phrase or word to quickly place and pay for an order. The phrase corresponds to details of the order and one phrase can contain orders with multiple merchants. Once the phrase is communicated, a service provider or merchant determines the order from the phrase and processes the order, which may include transmitting order details to the merchant(s) and processing the payment(s) to the merchant(s) on behalf of the user.

19 Claims, 4 Drawing Sheets

SIMPLIFIED ORDERS USING WORDS OR PHRASES

BACKGROUND

1. Field of the Invention

The present invention generally relates to online transactions, and in particular, to placing orders online.

2. Related Art

Ordering ahead of time provides consumers the advantage of not having to wait for an order to be ready. Ordering can be physical goods, drinks, food, etc. For example, a consumer can call a restaurant to order food to go or a consumer can place an online order for goods or a food order. After ordering, the consumer may go to a physical location to pick up the ordered items.

However, phone orders can be cumbersome and costly because the consumer needs to find and dial a number, talk to a person, which may take a while if the person is busy, and/or have the order misunderstood. The payee (e.g., a restaurant) incurs costs for having a person be available to answer and take orders from the consumer, as well as lost profits or revenue with incorrect orders.

Online orders alleviate some of these disadvantages. However, the consumer may feel that online ordering is too time-consuming, especially for regular or repeat orders the consumer makes to the same merchant or retailer. Some sites allow the user to save previous orders for simplified repeat ordering, but this does not help users who are away from their computers and may only have their mobile device. Due to the small data input (keypads) and screens, it may be difficult for the user to access the merchant site, log into the consumer's account, and navigate to find the ordering page.

Therefore, a need exists to provide the consumer an easier way to place orders.

SUMMARY

In different aspects of the present disclosure, a consumer or user transmits a word or phrase to place an order. The word or phrase is associated with a particular order at one or more different merchants, sellers, or retailers such that details of the order can be obtained from the word or phrase. As a result, the user can quickly and easily place an order electronically by simply entering a word or phrase.

In one embodiment, the user identifies specific items or goods to be associated with a word or phrase. For example, with a food order, the user may equate "one large thin crust pepperoni pizza with extra cheese, one liter of water, one meatball sub, and two sausage calzones" at Gino's Pizza Palace with the phrase "party1 ginos." This information is stored by an entity involved in the transaction, which may include the merchant, a payment provider, or third party service provider. Once the entity receives the phrase, the entity may determine the specifics of the order, such as items and merchant(s), and the user, such as through cookies, device ID, or other user/device identifier.

If the entity is the merchant, the merchant processes the order. The user may make the payment when picking up the order or when the order is released, such as in-person, through the merchant site or other means. If the entity is a payment provider, the payment provider sends the detailed order to the merchant for processing and then handles the payment from the user to the merchant. If the entity is a third party service provider, such as a website offering this service, the entity may send the detailed order to the merchant and communicate with a payment provider to handle payment.

In one embodiment, the user communicates the word or phrase through a social network, such as Twitter®. Other ways to communicate may include through a website, using the user's mobile device through voice or text, using the user's computing device through emails, etc.

The user may set up many different words or phrases for different orders. An order does not need to be for a single merchant, but can be with different merchants. For example, the user may consolidate an order with multiple merchants all located in the same location, such as a mall. The user may set up an order to include "a turkey and avocado sandwich with light mayonnaise and mustard on sourdough and a medium diet Coke at Joe's Subs," "a large vanilla frozen yogurt with chocolate chip topping at Yum Yum Frozen Yogurt," and "two boxes of Pamper's size 4 diapers and four boxes of Mom's Baby Formula at Winnie's Pharmacy." This order is associated with the phrase "lunch and baby at mall."

Thus, a user can place an order quickly and easily, even a complicated order with multiple items from multiple merchants, by simply entering a word or phrase into a user device, such as a phone.

These and other features and advantages of the present invention will be more readily apparent from the detailed description of the embodiments set forth below taken in conjunction with the accompanying drawings.

Figure 1:
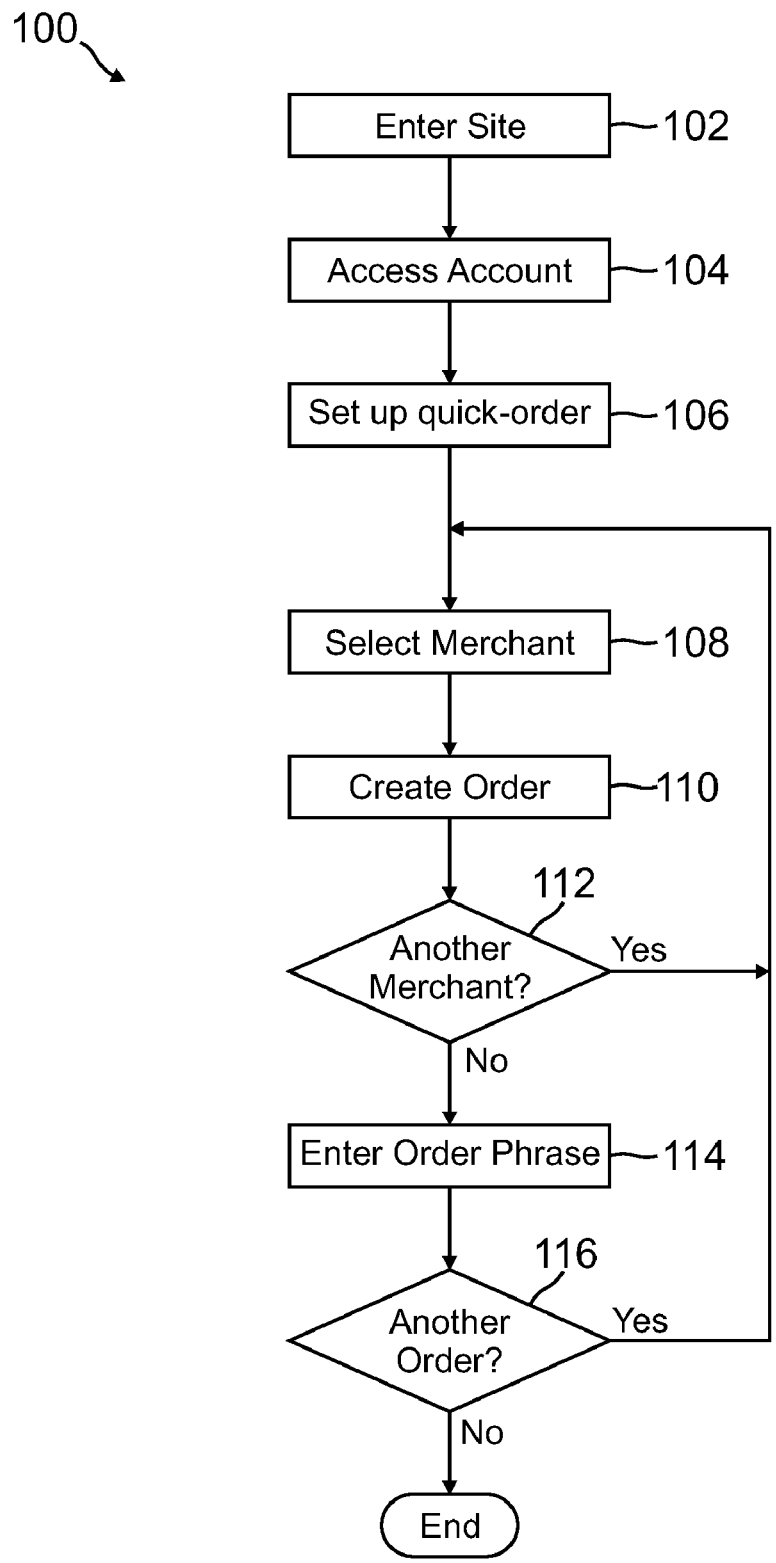
FIG. 1 shows a process for a user to set up a "quick-order" option using a word or phrase according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for a user to set up a "quick-order" option using a word or phrase (with "word" or "phrase" used herein to encompass both a word or a phrase) according to one embodiment. At step 102, the user enters a site facilitating the "quick-order" option. The site can be managed or maintained by a merchant, a payment provider, such as PayPal, Inc. of San Jose, Calif., a third party service provider, a retailer, a restaurant, or the like. In this embodiment, the site is managed by a payment provider. Entering the site of the payment provider may be accomplished in any number of ways, including accessing the URL of the site through a PC or other computing device, through an App on a mobile device, a browser on the mobile device, etc.

Next, the user may access, at step 104, the user's account with the payment provider, such as by providing a user identifier and password/PIN or other authenticating credentials. This can be done manually, automatically, or a combination of both, such as through cookies, device IDs, "remember me" functionalities, auto-fills, and entry through keypads, keyboards, or voice. If the user does not have an account with the payment provider, the user may be asked to create an account. Account creation may include the user providing certain information, such as name, user name, password, phone number, address, email, date of birth, bank account number, credit card number, and/or any other information as requested.

Once within the user's account, the user may select an option to set up the "quick-order" feature at step 106. The user may select a tab on the user's account page, click or tap a link or button, or other means to make the selection. The user is then presented with information about how to set up the "quick-order" feature.

The user may then enter requested information or follow instructions for setting up the feature. In this embodiment, the user selects or identifies, at step 108, a merchant, retailer, restaurant, or other entity or person with which the user will be placing the order with. "Merchant" may be used herein to refer to any of such entity or person. The selection or identification may be performed in any suitable way, including, but not limited to the user selecting participating merchants from a list or menu or the user using a search tool to find the merchant.

After the merchant is selected, the user creates an order, at step 110, for that merchant. The user may select desired offerings, such as items or services, from the merchant site, a listing on the payment provider site, a pull down or drop down menu of available offerings (which may be less than what is offered on the merchant's site) from the payment provider site, or any suitable means. Individually selected items may be edited as needed. For example, if the user selects a shirt, the user also selects a size. If the user selects a food item, the user may also select substitutions, additions and/or deletions to the food item. For example, if the user selects a pizza, the user may select toppings, the type of crust, and the size. The user selects all desired items for this order from the selected merchant. At the end of the selection, the user may confirm or edit the order as needed.

Once, confirmed, if the user wishes to add items to the order from a different merchant, as determined at step 112, the user selects the new merchant at step 108 and continues the process described above.

Once the user has selected and confirmed all desired items from all desired merchants, the user enters a word or phrase at step 114 to identify the order. In one embodiment, the user types in the word or phrase via a keyboard, keypad, or other data input means on a user device. In another embodiment, the user inputs the word or phrase by voice, such as speaking into the user device. Other entry means may also be suitable. The word or phrase may have enough descriptors so that the user can easily remember and use the word or phrase when needed. If the user ends up having many different "quick-order" phrases, each phrase may need to be even more descriptive. However, if the user only has a few phrases, the phrases may be more general.

In one example, the user may select a word or phrase like "order1" or "food order" if the user only has a few orders. Examples of more descriptive phrases include "Burger Palace," "party order Sid's Sandwich," "diaper order," "diaper order Don's Drugs," "Newport Mall," and the like. Optionally, the user may confirm or edit the word/phrase and order as needed or requested. Once confirmed or entered, the system associates the word/phrase with the details of the order and the user's account.

If the user wishes to set up another "quick-order" phrase for another order, as determined at step 116, the user selects a merchant at step 108, which may be the same as a previous merchant or a new merchant. The process continues until the user is finished with the session, i.e., no more merchants or orders to add.

Note the user may also set limits or restrictions for the quick-order feature. This, along with other steps described above, can be done in any feasible order. Examples of limits include, but are not limited to, prefunding a quick-order account such that little or no additional authentication is needed when processing the order, setting a minimum dollar amount or transaction number for a transaction, a set number of transactions, or a time period, and setting an order amount in which little or no authentication would be needed. Such limitations may be applied to all orders, some orders, or for each order.

Figure 2:
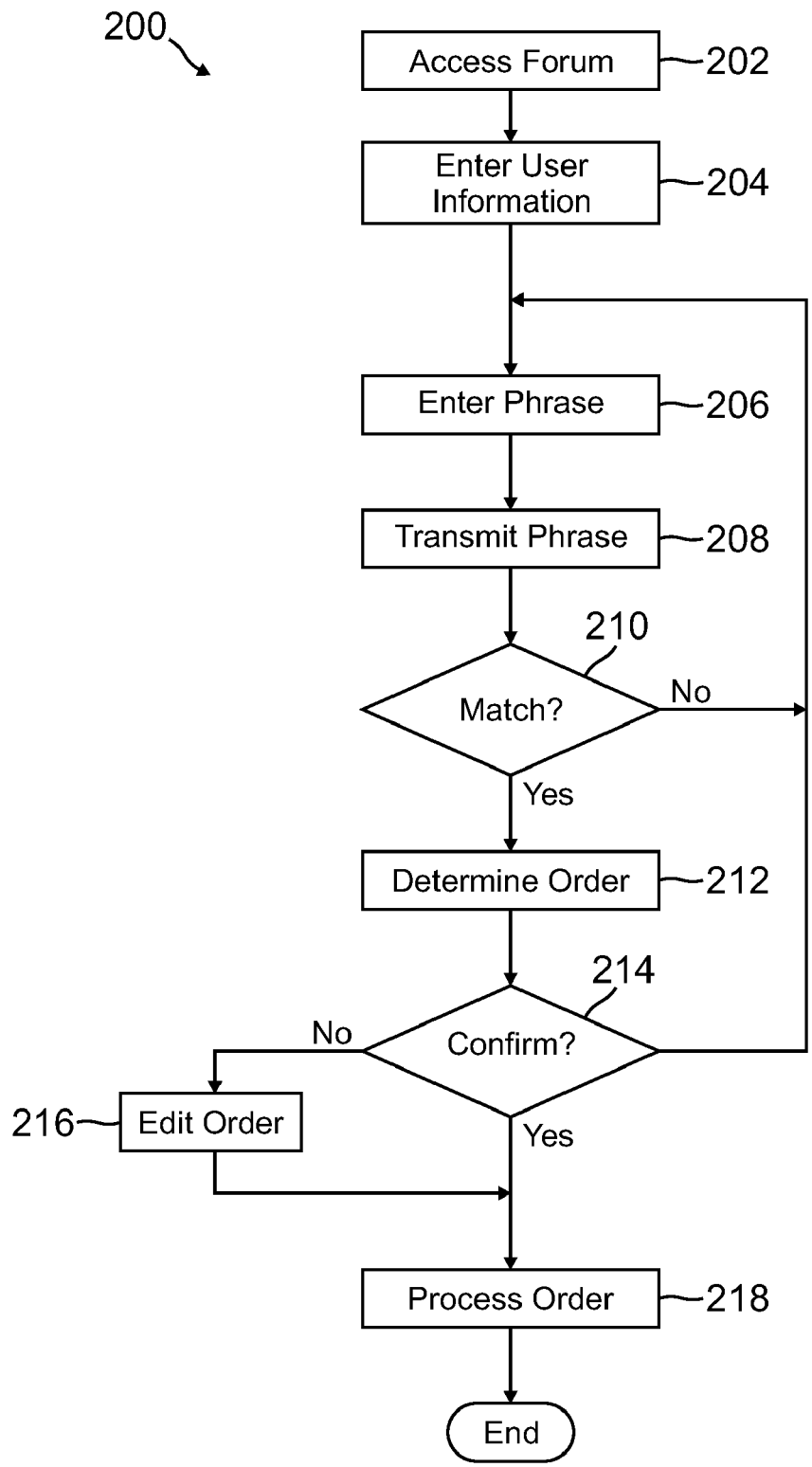
FIG. 2 shows a process for conducting an order using the "quick-order" option according to one embodiment.

FIG. 2 is a flowchart 200 showing a process for conducting an order using the "quick-order" option according to one embodiment. At step 202, the user accesses the appropriate forum for entering the quick-order phrase. For example, the user may access a payment provider site, an App on a mobile device, a merchant site, or a third party site. If the user is not required to access a site, this step may include accessing a screen for entering the quick-order phrase, such as the text option on a user device, a user email account, or a keypad/keyboard to dial a number for voice input.

Next, the user enters user information, at step 204. User information may include a user identifier and/or a user password/PIN. The user identification may be a user name, phone number, email address, etc. In some embodiments, the user also enters a password or PIN. Entry of user information may be done in any number of ways, including manually entering from a keypad or keyboard, by voice, etc. Note that entry of a user identifier and/or a password/PIN may be skipped in different embodiments. For example, the user identification step may be skipped if the user ID is automatically communicated as part of the user communication, such as through cookies, a user phone number, or device ID. Entering a password or PIN may be skipped if the user is authenticated without such data or the system does not require authentication, such as if the user has a "remember me" type of functionality or pre-authorized a setting that does not require authentication to use the quick-order feature.

If the user does not have an account or the system cannot find a user account, the user may be asked to re-enter information or create an account. Account creation may include providing a user name, password, phone number, email address, address, credit card information, bank account information, and/or any other requested information by the system.

Next, the user enters the quick-order phrase at step 206. Again, this can be done in any number of different ways. Examples include typing in the phrase using a device keyboard, keypad, or other data entry means, selecting the phrase from a drop down menu or list of user phrases, or speaking the phrase into an audio input.

Once entered or selected, the user transmits the phrase, at step 208. In one embodiment, the user selects a "return" button or link, a "send" button or link, or the like. In another embodiment, the user speaks into a device, which transmits the audio phrase.

After transmission of the quick-order phrase, the system receives the phrase and determines, at step 210, whether the received phrase matches a phrase associated with the user. The system may access the user's account using received user information from step 204 and retrieve quick-order phrases associated with the account. The system may then determine if the received phrase matches with at least one of the phrases in the user's account. If there is no match, the user may be requested to enter the phrase again at step 206.

Once a match is found, the system determines details of the order at step 212. Details may include the exact description of an item or service, a quantity of each item or service, and merchant information for each item or service. As discussed above, the order may include multiple merchants. The details of the order may then be communicated to the user. For example, the user may see, on a display of the user device, a listing of the order from each merchant.

After receiving the order details, the user determines, at step 214, whether to confirm the order. The user may choose not to confirm the order for any number of reasons, including changing his/her mind or wanting to modify or revise the order. For whatever reason, if the user does not want to confirm the order as presented, the user may edit the order at step 216. Editing the order may include canceling the order, such as by selecting an appropriate button, link, or box. If, however, the user does not wish to cancel the order, the user may revise as desired. For example, the user can change one or more quantities, remove one or more items, add one or more items, change details of one or more items, etc. This may be accomplished in any number of ways, including manually making the changes through a device input, such as a keyboard/keypad.

After the user is satisfied with the edited order from step 216 or confirms the original order from step 214, the order is processed at step 218. Order processing may include transmitting the details of the order to the appropriate merchant(s), debiting an appropriate amount from a user account, crediting an appropriate amount to one or more merchant accounts, notifying the merchant(s) and/or the user of a successful transaction, etc. The user may then pick up or otherwise receive the purchased items.

In one example, a third party site, which we will call TweetEat.com, is used to process the quick-order transaction. Merchants or restaurant/food establishments sign up for the service on the site, which can include account details, contact information, etc. The merchant uploads menu items to be offered and pricing to the site, which may be a take-out or full menu. The consumer also signs up for the service at the site, which may include providing account details, funding details, one or more phrases associated with order details for a merchant, password, etc. Funding details may include account information for a payment provider, such as PayPal.

When the consumer wishes to place a quick-order, the consumer "tweets" @tweeteat with the quick-order phrase. TweetEat handles the message and sends it to the merchant. The consumer's account is automatically debited for the amount of the order, including any fees from the third party or payment provider. The customer then goes to the merchant and picks up the order, such as by showing identification or a receipt.

Thus, the user is able to quickly and easily place an order with one or more merchants, saving both time and effort. These advantages may be even more pronounced with mobile devices, which have smaller displays and keypads/keyboards.

Figure 3:
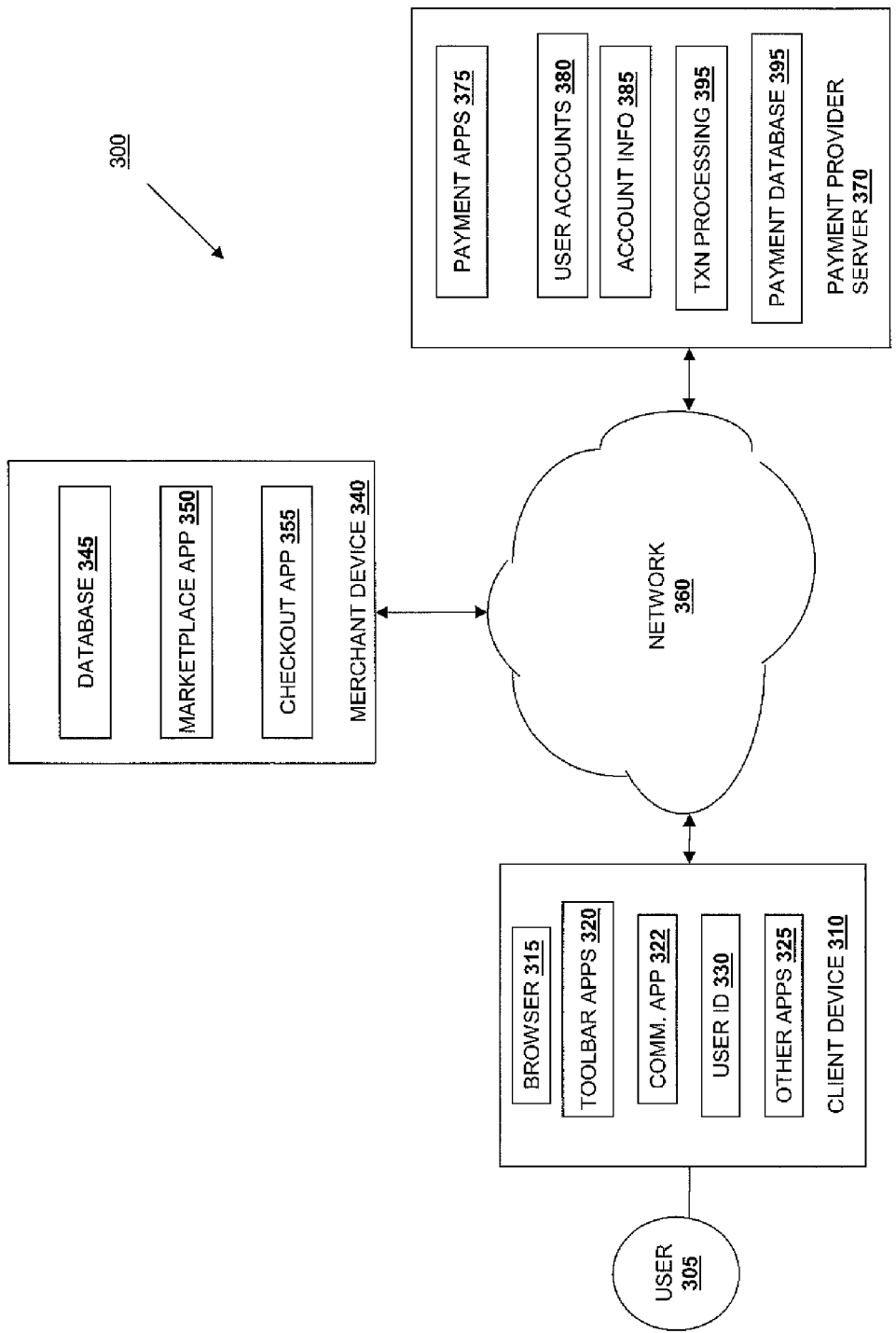
FIG. 3 is block diagram of a networked system suitable for implementing the process of FIGS. 1 and 2 according to an embodiment.

FIG. 3 is a block diagram of a networked system 300 configured to handle a financial transaction between a payment recipient (e.g., merchant) and a payment sender (e.g., user or consumer), such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as the sender or consumer, utilizes user device 310 to perform a payment transaction with merchant server 340 using payment provider server 370.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™

User device 310 may include one or more browser applications 315 which may be used, for example, to provide a convenient interface to permit user 305 to browse information available over network 360. For example, in one embodiment, browser application 315 may be implemented as a web browser configured to view information available over the Internet. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications that enable the user to communicate, place orders, and make payments through the payment provider as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider as further described herein. A communications application 322, with associated interfaces, enables user device 310 to communicate within system 300.

Merchant server 340 may be maintained, for example, by an on-line merchant or seller offering various products and/or services in exchange for payment to be received over network 360. Generally, merchant server 340 may be maintained by anyone or any entity that receives money, which includes charities as well as retailers and restaurants. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360. For example, checkout application 355 may receive and process a payment confirmation from payment service provider server 370, as well as transmit transaction information to the payment provider and receive information from the payment provider (e.g., a transaction ID). Checkout application 355 may also be configured to accept one or more different funding sources for payment.

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services by user 305 of first user device 310 using a quick-order phrase as discussed above.

Payment provider server 370 also maintains a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by user 305. Advantageously, payment application 375 may be configured to interact with merchant server 340 on behalf of user 305 during a transaction with checkout application 355 to track and manage purchases made by users and which funding sources are used.

A transaction processing application 390, which may be part of payment application 375 or separate, may be configured to receive information from a user device and/or merchant server 340 for processing and storage in a payment database 395. Transaction processing application 390 may include one or more applications to process information from user 305 for processing an order and payment using a quick-order phrase as described herein. As such, transaction processing application 390 may store details of an order associated with a phrase from individual users. Payment application 375 may be further configured to determine the existence of and to manage accounts for user 305, as well as create new accounts if necessary, such as the set up, management, and use of quick-order phrases.

Figure 4:
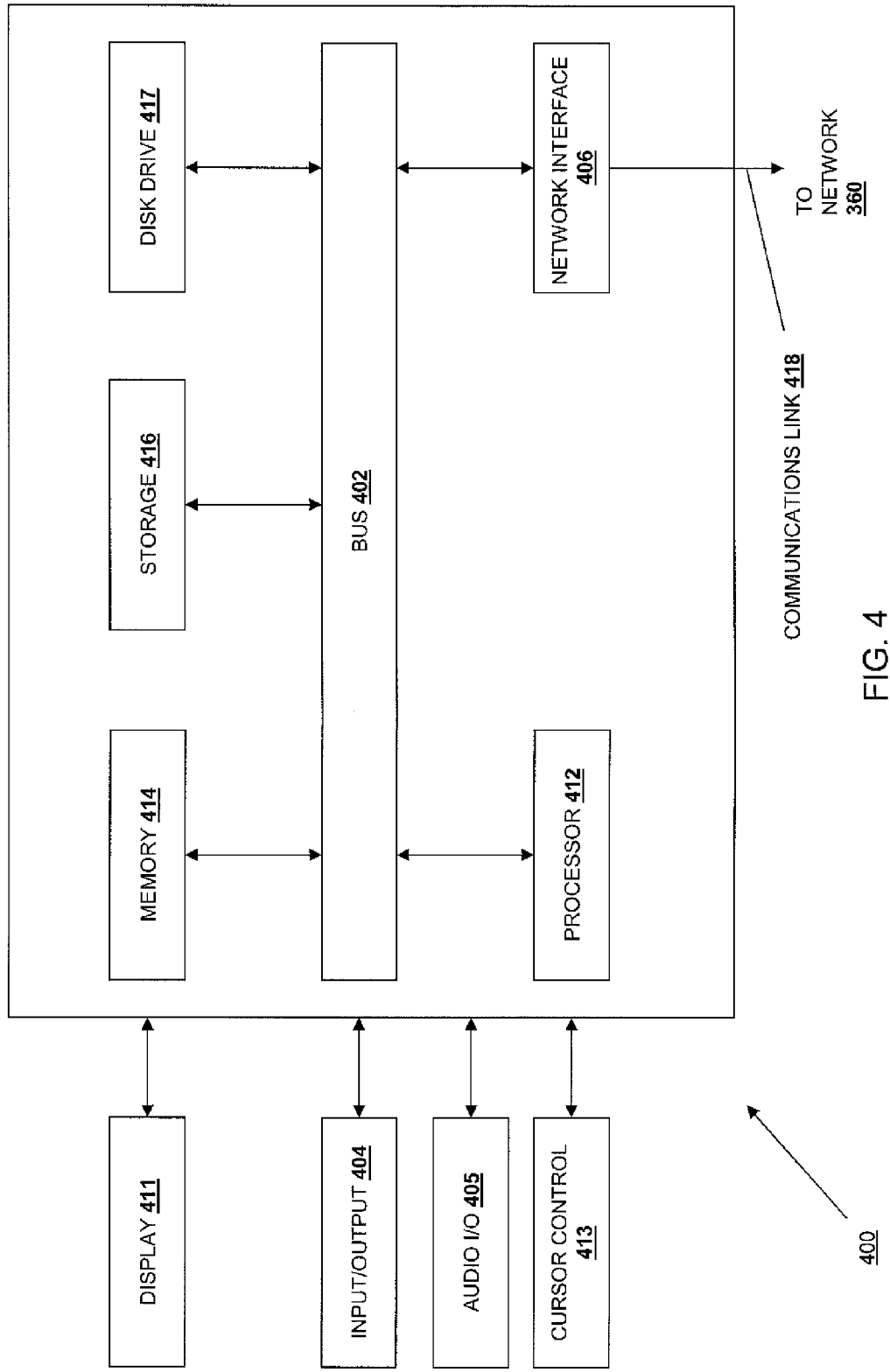
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system of processing an order, comprising:
a memory storing information about user accounts, wherein the information comprises one or more phrases associated with a user and multiple merchants for a plurality of orders with the multiple merchants; an
one or more processors configured for
receiving, by a third party payment provider, identification information of a user;
receiving the phrase associated with the user and the plurality of orders, wherein the phrase is unique to the plurality of orders associated with the multiple merchants;
determining, by the payment provider, details of the order from the phrase, wherein the determining comprises determining the merchant(s) associated with the order from the phrase; and
processing the order, wherein the processing comprises debiting an account of the user with the payment provider and crediting an account of the merchant(s) with the payment provider.

2. The system of claim 1, wherein the phrase is selected by the user and contains less characters than the order.

3. The system of claim 1, wherein the processing comprises transmitting the details to a merchant and making a payment to the merchant on behalf of the user.

4. The system of claim 1, wherein the phrase is received by text.

5. The system of claim 1, wherein the phrase is received by audio.

6. The system of claim 1, further comprising requesting a confirmation of the details from the user.

7. The system of claim 6, further comprising receiving one or more edits of the order from the user.

8. The system of claim 1, further comprising setting up the phrase.

9. The system of claim 8, wherein the setting up comprises:
receiving details of the order;
receiving the phrase from the user; and
storing the details and the phrase with an account of the user.

10. The system of claim 1, wherein the details comprise a merchant identifier and information about one or more items or services to be purchased from the merchant.

11. A non-transitory machine-readable medium comprising a plurality of machine-readable instructions which when executed by one or more processors of a server are updated to cause the server to perform a method comprising:
receiving, by a third party payment provider, identification information of a user;
receiving a phrase associated with the user and a plurality of orders associated with multiple merchants, wherein the phrase is unique to the plurality of orders associated with the multiple merchants;
determining, by the payment provider, details of the order from the phrase, wherein the determining comprises determining the merchant(s) associated with the order from the phrase; and
processing the order, wherein the processing comprises debiting an account of the user with the payment provider and crediting an account of the merchant(s) with the payment provider.

12. The non-transitory machine-readable medium of claim 11, wherein the phrase is selected by the user and contains less characters than the order.

13. The non-transitory machine-readable medium of claim 11, wherein the processing comprises transmitting the details to a merchant and making a payment to the merchant on behalf of the user.

14. The non-transitory machine-readable medium of claim 11, wherein the phrase is received by text.

15. The non-transitory machine-readable medium of claim 11, wherein the method further comprises requesting a confirmation of the details from the user.

16. The non-transitory machine-readable medium of claim 15, wherein the method further comprises receiving one or more edits of the order from the user.

17. The non-transitory machine-readable medium of claim 11, wherein the method further comprises setting up the phrase.

18. The non-transitory machine-readable medium of claim 17, wherein the setting up comprises:
receiving details of the order;
receiving the phrase from the user; and
storing the details and the phrase with an account of the user.

19. The non-transitory machine-readable medium of claim 11, wherein the details comprise a merchant identifier and information about one or more items or services to be purchased from the merchant.

* * * * *